United States Patent
Tseng et al.

(10) Patent No.: US 8,499,186 B2
(45) Date of Patent: Jul. 30, 2013

(54) CLOCK GENERATOR AND USB MODULE

(75) Inventors: Wen-Yu Tseng, Taipei (TW); Hsiao-Chyi Lin, Taipei (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 347 days.

(21) Appl. No.: 12/776,523

(22) Filed: May 10, 2010

(65) Prior Publication Data
US 2011/0138214 A1   Jun. 9, 2011

(30) Foreign Application Priority Data
Dec. 4, 2009   (TW) ............................... 98141476 A

(51) Int. Cl.
*G06F 1/00* (2006.01)

(52) U.S. Cl.
USPC ............ 713/500; 713/400; 713/600; 331/158

(58) Field of Classification Search
USPC .......................... 713/400, 500–601; 331/158
See application file for complete search history.

(56) References Cited

U.S. PATENT DOCUMENTS

| | | | | |
|---|---|---|---|---|
| 6,131,135 | A * | 10/2000 | Abramson et al. | 710/113 |
| 6,240,123 | B1 * | 5/2001 | Zhang et al. | 375/130 |
| 6,278,338 | B1 * | 8/2001 | Jansson | 331/116 FE |
| 6,597,226 | B1 * | 7/2003 | Eade et al. | 327/292 |
| 7,127,628 | B2 * | 10/2006 | Chang | 713/400 |
| 7,224,349 | B2 * | 5/2007 | Irie | 345/204 |
| 7,434,083 | B1 * | 10/2008 | Wilson | 713/600 |
| 7,917,796 | B2 * | 3/2011 | Wilson | 713/500 |
| 7,953,175 | B2 * | 5/2011 | Hariton et al. | 375/295 |
| 8,069,294 | B2 * | 11/2011 | Derr et al. | 710/305 |
| 8,140,882 | B2 * | 3/2012 | Lee et al. | 713/400 |
| 2008/0085124 | A1 * | 4/2008 | Leung et al. | 398/155 |
| 2008/0276113 | A1 * | 11/2008 | Tabeta | 713/500 |
| 2009/0327536 | A1 * | 12/2009 | Solomon et al. | 710/63 |
| 2010/0005327 | A1 * | 1/2010 | Murata | 713/320 |
| 2010/0122106 | A1 * | 5/2010 | Lee et al. | 713/503 |
| 2010/0169511 | A1 * | 7/2010 | Dunstan et al. | 710/16 |
| 2011/0016346 | A1 * | 1/2011 | Lee et al. | 713/503 |
| 2011/0070751 | A1 * | 3/2011 | Lee | 439/83 |

FOREIGN PATENT DOCUMENTS

TW   512585   12/2002

OTHER PUBLICATIONS

Hewlett-Packard Company et al. USB 3.0 CDR Model White Paper. Revision 0.5. Jan. 15, 2009.*
Hewlett-Packard Company et al. Universal Serial Bus 3.0 Specification. Revision 1.0. Nov. 12, 2008.*

(Continued)

*Primary Examiner* — Matthew D Spittle
(74) *Attorney, Agent, or Firm* — McClure, Qualey & Rodack, LLP

(57) ABSTRACT

A clock generator is provided. The clock generator includes a crystal oscillator, an inverter coupled to the crystal oscillator in parallel, a first circuit and a second circuit. The crystal oscillator has a first terminal and a second terminal. The inverter generates a first signal and a second signal at the first and second terminals of the crystal oscillator, respectively. The first circuit coupled to the first terminal of the crystal oscillator generates a first clock signal with a constant frequency according to the first signal. The second circuit coupled to the second terminal of the crystal oscillator generates a second clock signal with a variable frequency according to the second signal.

13 Claims, 2 Drawing Sheets

OTHER PUBLICATIONS

Gaci, Sabah. PLDA Announces Superspeed USB IP Solutions, Providing Designers with Immediate Ability to Integrate USB 3.0 Host and Device Functionality. Business Wire. Nov. 13, 2008.*

Compaq et al. Universal Serial Bus Specification. Revision 2.0. Apr. 27, 2000.*

Freescale Semiconductor. Using a 32.768kHz Crystal to Generate System Clock and USB in i.MX. Application Note. Rev. 1. Mar. 2005.*

Philips Electronics. X-tal oscillators on 8-bit microcontrollers. Application Note. 1996.*

Cypress Semiconductor Corporation. 133-MHz Spread Spectrum Clock Synthesizer/Driver with AGP, USB, and DRCG Support. Dec. 14, 2002.*

Motorola. 14-Stage Binary Ripple Counter with Oscillator. Oct. 1995.*

English language translation of abstract of TW 512585 (published Dec. 1, 2002).

* cited by examiner

CLOCK GENERATOR AND USB MODULE

CROSS REFERENCE TO RELATED APPLICATIONS

This application claims priority of Taiwan Patent Application No. 098141476, filed on Dec. 4, 2009, the entirety of which is incorporated by reference herein.

BACKGROUND OF THE INVENTION

1. Field of the Invention

The invention relates to a clock generator, and more particularly to a clock generator of a Universal Serial Bus (USB) module.

2. Description of the Related Art

A Universal Serial Bus (USB) is a serial bus standard for external apparatus connection, providing hot plug, plug and play and other related functions.

Currently, the USB 2.0 standard provides three transfer rates: low-speed, full-speed, and high-speed transfer rates, which support: 1.5 Mbps; 12 Mbps; and 480 Mbps data rates, respectively. However, even faster transfer rates are being demanded for electronic apparatuses, due to continued advanced technological development, so that the electronic apparatuses may quickly access data from external apparatuses and subsequently perform related operations.

Therefore, a next generation USB industry-standard, the USB 3.0 standard, was established by the USB Implementers Forum. The USB 3.0 standard allows employment of Super-Speed data transfer and non-SuperSpeed (i.e. USB 2.0) data transfer simultaneously, wherein SuperSpeed data transfer supports up to a 5 Gbps data rate.

BRIEF SUMMARY OF THE INVENTION

A clock generator and USB module are provided. An embodiment of a clock generator includes a crystal oscillator, an inverter coupled to the crystal oscillator in parallel, a first circuit, and a second circuit. The crystal oscillator has a first terminal and a second terminal. The inverter generates a first signal and a second signal at the first and second terminals of the crystal oscillator, respectively. The first circuit coupled to the first terminal of the crystal oscillator generates a first clock signal with a constant frequency according to the first signal. The second circuit coupled to the second terminal of the crystal oscillator generates a second clock signal with a variable frequency according to the second signal.

Furthermore, an embodiment of a USB module is provided. The USB module includes a clock generator, a USB 3.0 controller coupled to the clock generator, and a USB 2.0 controller coupled to the clock generator. The clock generator generates a clock signal and a spread spectrum clock signal. The USB 3.0 controller performs SuperSpeed data transfer according to the spread spectrum clock signal. The USB 2.0 controller performs non-SuperSpeed data transfer according to the clock signal.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

For a host or a device that supports the USB 3.0 standard, spread spectrum technology is used to spread the frequency of SuperSpeed signals up to a 5 Gbps data rate. Spreading the energy of a specific frequency causes SuperSpeed signals to have a low energy distribution or a low frequency range, thereby decreasing Electromagnetic Interference (EMI) for a USB 3.0 host or a USB 3.0 device.

In a synchronous digital system, a clock signal is used to drive the system, and the clock signal is often one of the major EMI sources. Because of its periodic nature, the clock signal has an unavoidably narrow frequency spectrum. In fact, a perfect clock signal may have its energy concentrated within a single frequency and harmonics thereof and therefore radiate energy with an infinite spectral density. Practical synchronous digital systems radiate electromagnetic energy on a number of narrow bands spread across the clock frequency and its harmonics, resulting in a frequency spectrum that, at certain frequencies, can exceed the regulatory limits for electromagnetic interference (e.g. such as those of the Federal Communications Commission (FCC) in the United States, JEITA in Japan and IEC in Europe).

Spread spectrum clock generator (SSCG) is used in synchronous digital systems, especially those containing microprocessors, to reduce the spectral density of the EMI generated by these systems. SSCG, which is a special situation of wide-band frequency modulation (FM), can efficiently lower fundamental and higher-order harmonics of a clock signal, e.g. reduce the peak radiated energy of the clock signal, to effectively decrease EMI emission. Thus, SSCG reshapes electromagnetic emissions of a system to comply with Electromagnetic Compatibility (EMC) regulations.

Figure 1:
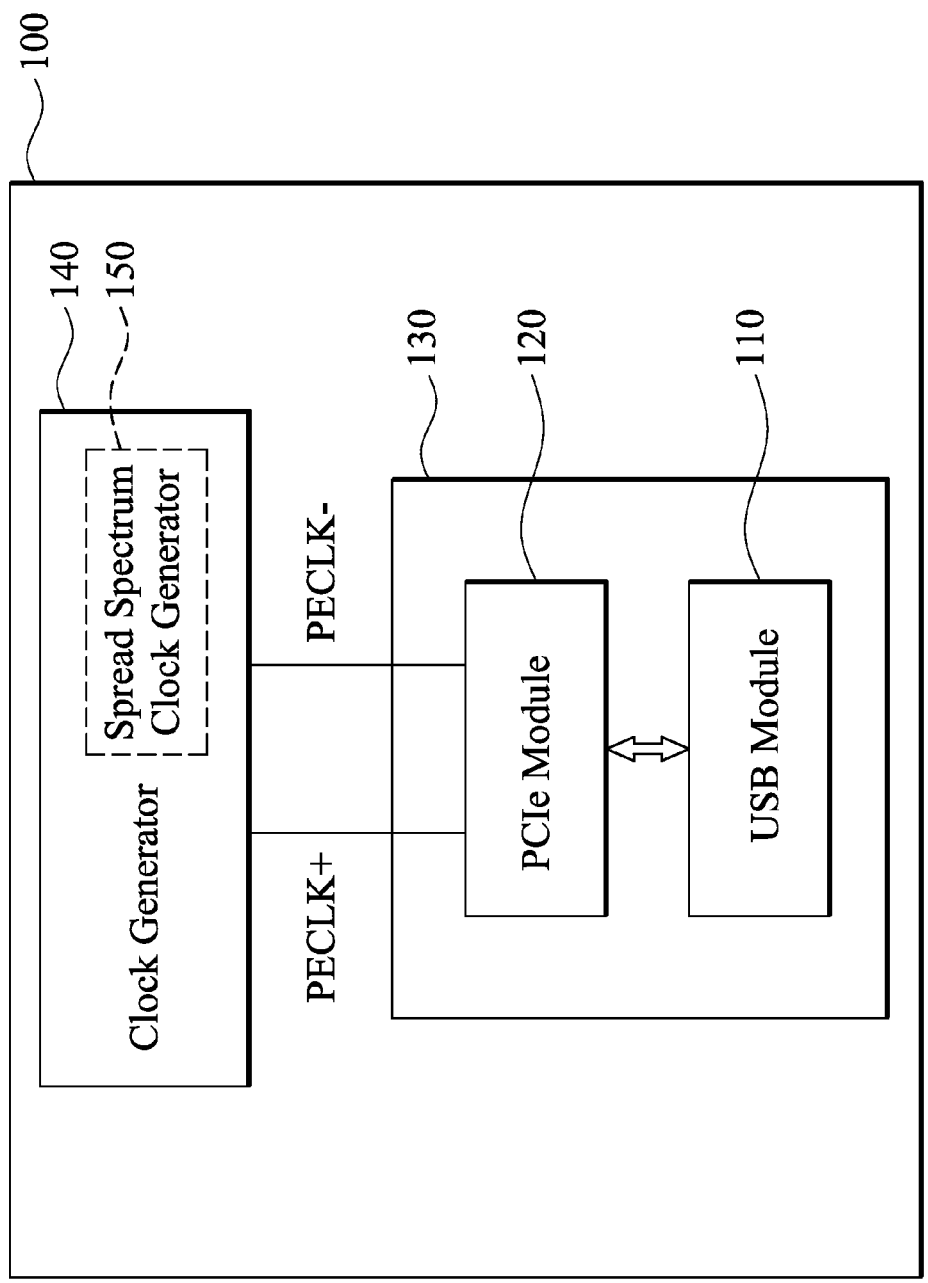
FIG. 1 shows a bridge chip according to an embodiment of the invention.

FIG. 1 shows a bridge chip 130 according to an embodiment of the invention, wherein the bridge chip 130 includes a Peripheral Component Interconnect Express (PCIe) module 120 and a USB module 110. In FIG. 1, the bridge chip 130 is implemented in a main board 100, which may provide data transfer between a PCIe standard and a USB standard. In the main board 100, a clock generator 140 provides a clock signal PECLK+ and a clock signal PECLK- to the bridge chip 130 for the PCIe module 120, wherein the clock signals PECLK+ and PECLK- provided by the clock generator 140 are used as reference clocks of the PCIe module 120. In general, frequencies of the clock signals PECLK+ and PECLK- are 100 MHz. Furthermore, for a PCIe standard, spread spectrum clocks are optional. Therefore, the clock signals PECLK+ and PECLK- are the spread spectrum clocks when a spread spectrum clock generator 150 is implemented in the main board 100, and the reference clocks of the PCIe module 120 may also be the spread spectrum clocks. Note that the reference clocks of the PCIe module 120 include no spread spectrum constituents when the spread spectrum clock generator 150 is not implemented in the main board 100. Because the main board 100 may not provide spread spectrum clock signals to the bridge chip 130, the USB module 110 of the bridge chip 130 must have a spread spectrum clock generator, so as to provide a reference clock with spread spectrum constituents to receive and transmit SuperSpeed signals.

Figure 2:
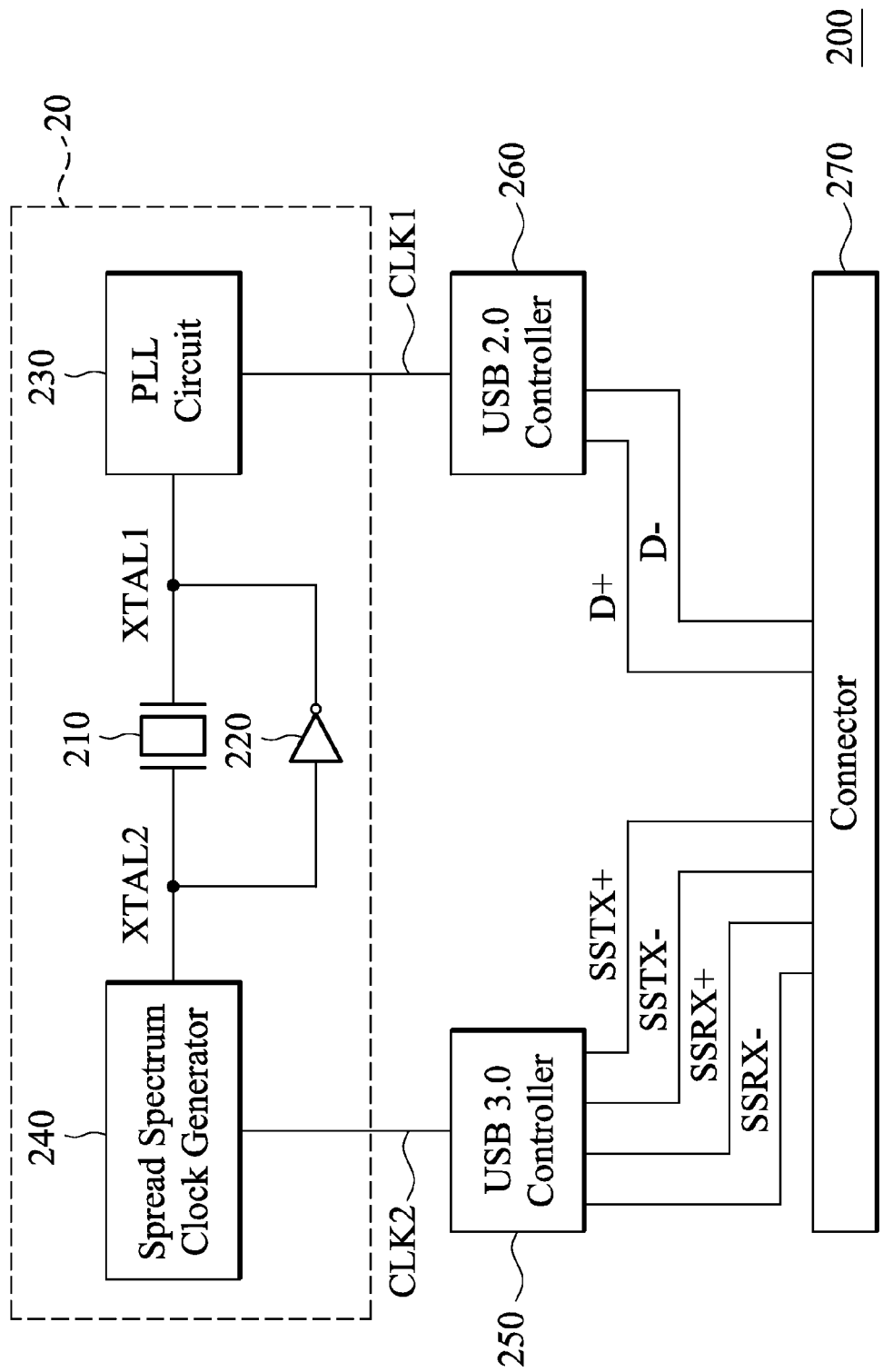
FIG. 2 shows a USB module according to an embodiment of the invention.

FIG. 2 shows a USB module 200 according to an embodiment of the invention. The USB module 200 includes a clock generator 20, a USB 3.0 controller 250, a USB 2.0 controller 260 and a connector 270. The clock generator 20 includes a crystal oscillator 210, an inverter 220, a phase locked loop (PLL) circuit 230 and a spread spectrum clock generator (SSCG) 240. In the clock generator 20, the crystal oscillator 210 starts to oscillate and generates the signals XTAL1 and XTAL2 by coupling the inverter 220 and the crystal oscillator 210 in parallel, wherein the signal XTAL2 is an inverted signal of the signal XTAL1. As shown in FIG. 2, the PLL circuit 230 is coupled between the crystal oscillator 210 and the USB 2.0 controller 260, and the SSCG 240 is coupled between the crystal oscillator 210 and the USB 3.0 controller 250, wherein the PLL circuit 230 and the SSCG 240 are coupled to two terminals of the crystal oscillator 210, respectively. The PLL circuit 230 receives the signal XTAL1 and provides a clock signal CLK1 to the USB controller 260 according to the signal XTAL1. The PLL circuit 230 is a circuit which uses a feedback scheme to synchronize the clock signal CLK1 and the signal XTAL1. In the embodiment, frequency of the clock signal CLK1 is larger than that of the signal XTAL1. In addition, the frequency of the clock signal CLK1 is determined according to an actual operating frequency of the USB 2.0 controller 260. Next, the USB 2.0 controller 260 may receive and transmit a pair of differential signals D+/D− that conform to the USB 2.0 standard via the connector 270. In order to simplify the description, the ground and power wires of the connector 270 are not described further.

In FIG. 2, the SSCG 240 receives the signal XTAL2 and provides the clock signal CLK2 to the USB 3.0 controller 250 according to the signal XTAL2, wherein the signal XTAL2 is a spread spectrum clock signal. The SSCG 240 adds jitter to the clock signal CLK2 according to the signal XTAL2, such that the clock signal CLK2 has a variable frequency. Thus, EMI energy is broken up by specific frequencies, and then the degree of interference thereby is decreased. In the embodiment, the frequency of the clock signal CLK2 is larger than that of the signal XTAL2. In addition, the frequency of the clock signal CLK2 is determined according to the actual operating frequency of the USB 3.0 controller 250. Next, the USB 3.0 controller 250 may receive and transmit the differential signals that conform to a SuperSpeed standard via the connector 270, wherein the SuperSpeed differential signals include a pair of transmitter differential signals SSTX+/SSTX− and a pair of receiver differential signals SSRX+/SSRX−.

In FIG. 2, the USB module 2.0 controller 260 performs non-SuperSpeed data transfer (e.g. the pair of differential signals D+/D−) according to the clock signal CLK1, and the USB module 3.0 controller 250 performs SuperSpeed data transfer (e.g. the pair of differential signals SSTX+/SSTX− and the pair of differential signals SSRX+/SSRX−) according to the clock signal CLK2. Therefore, the frequency of the clock signal CLK2 is larger than the frequency of the clock signal CLK1.

In FIG. 2, the USB module 200 may be implemented in a host or a device that supports the USB 3.0 standard. For example, when the USB module 200 is implemented in the bridge chip 130 of FIG. 1 (i.e. the host), the connector 270 may be a USB 3.0 receptacle, such as a receptacle that conform to a Standard-A, a Standard-B, a Micro-AB or a Micro-B standard. On the contrary, when the USB module 200 is implemented in the device (e.g. a pen drive or a MP3 player), the connector 270 may be a USB 3.0 plug, such as a plug that conform to a Standard-A, a Standard-B, a Micro-AB or a Micro-B standard.

According to the embodiment of FIG. 2, by using the signals XTAL1 and XTAL2 at the two terminals of the crystal oscillator 210, a clock signal CLK1 with a constant frequency and a clock signal CLK2 with a variable frequency are generated through the PLL circuit 230 and the SSCG 240, respectively.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A clock generator, comprising:
   a crystal oscillator, having a first terminal and a second terminal;
   an inverter coupled to the crystal oscillator in parallel, generating a first signal and a second signal at the first and second terminals of the crystal oscillator, respectively;
   a first circuit coupled to the first terminal of the crystal oscillator, generating a first clock signal with a constant frequency according to the first signal; and
   a second circuit coupled to the second terminal of the crystal oscillator, generating a second clock signal with a variable frequency according to the second signal,
   wherein the crystal oscillator is directly connected to the first circuit by the first terminal, and the crystal oscillator is directly connected to the second circuit by the second terminal.

2. The clock generator as claimed in claim 1, wherein the first circuit is a phase locked loop circuit and the second circuit is a spread spectrum clock generator.

3. The clock generator as claimed in claim 1, wherein the second clock signal is a spread spectrum clock signal, and the second circuit provides the second clock signal to a Universal Serial Bus (USB) controller for performing SuperSpeed data transfer.

4. The clock generator as claimed in claim 3, wherein the USB controller is a controller that supports the USB 3.0 standard.

5. The clock generator as claimed in claim 1, wherein the first circuit provides the first clock signal to a USB controller for performing non-SuperSpeed data transfer.

6. The clock generator as claimed in claim 5, wherein the USB controller is a controller that supports the USB 2.0 standard.

7. The clock generator as claimed in claim 1, wherein the second signal is an inverted signal of the first signal.

8. The clock generator as claimed in claim 7, wherein frequency of the first clock signal is larger than frequency of the first signal, and frequency of the second clock signal is larger than the frequency of the first clock signal.

9. A Universal Serial Bus (USB) module, comprising:
   a clock generator, generating a clock signal and a spread spectrum clock signal;
   a USB 3.0 controller coupled to the clock generator, performing SuperSpeed data transfer according to the spread spectrum clock signal; and
   a USB 2.0 controller coupled to the clock generator, performing non-SuperSpeed data transfer according to the clock signal, wherein the clock generator comprises:
a crystal oscillator, having a first terminal and a second terminal;
an inverter coupled to the crystal oscillator in parallel, generating a first signal and a second signal at the first and second terminals of the crystal oscillator, respectively;
a first circuit coupled to the first terminal of the crystal oscillator, generating the clock signal according to the first signal; and
a second circuit coupled to the second terminal of the crystal oscillator, generating the spread spectrum clock signal according to the second signal,
wherein the crystal oscillator is directly connected to the first circuit by the first terminal, and the crystal oscillator is directly connected to the second circuit by the second terminal.

10. The USB module as claimed in claim 9, wherein the clock signal has a constant frequency and the spread spectrum clock signal has a variable frequency.

11. The USB module as claimed in claim 9, wherein the first circuit is a phase locked loop circuit and the second circuit is a spread spectrum clock generator.

12. The USB module as claimed in claim 9, wherein the second signal is an inverted signal of the first signal.

13. The USB module as claimed in claim 12, wherein frequency of the clock signal is larger than frequency of the first signal, and frequency of the spread spectrum clock signal is larger than the frequency of the clock signal.

* * * * *